CONVEYANCE LOADER SYSTEM

Original Filed July 14, 1966 4 Sheets-Sheet 1

INVENTOR
WILLIAM M. RIGGLES, JR.
Shanley & O'Neil
ATTORNEYS

CONVEYANCE LOADER SYSTEM

Original Filed July 14, 1966 4 Sheets-Sheet 2

INVENTOR
WILLIAM M. RIGGLES, JR.
BY Shanley & O'Neil
ATTORNEYS

CONVEYANCE LOADER SYSTEM
Original Filed July 14, 1966 4 Sheets-Sheet 3
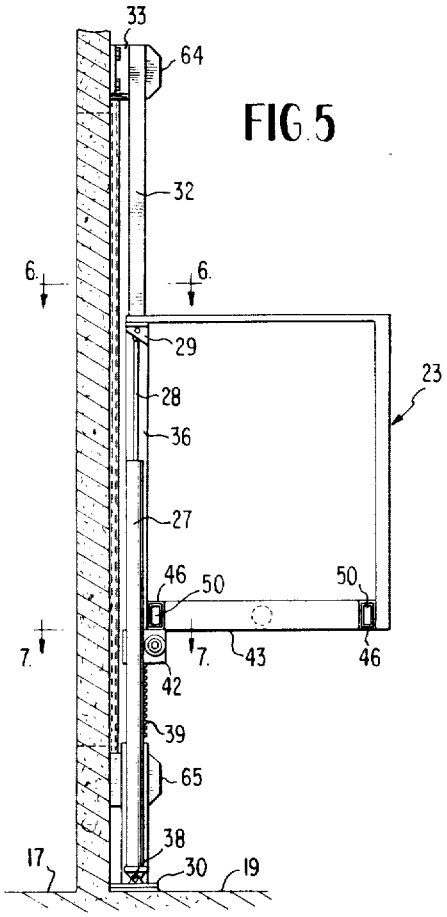
FIG. 5
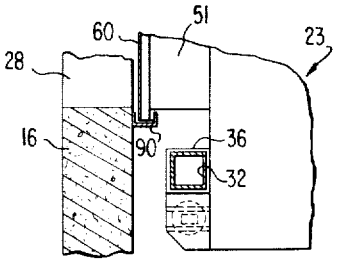
FIG. 6
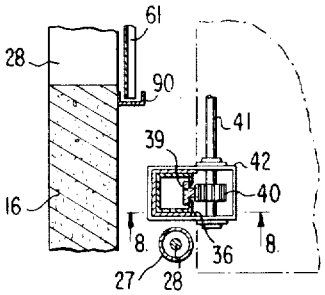
FIG. 7
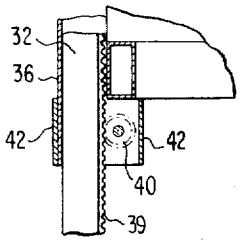
FIG. 8
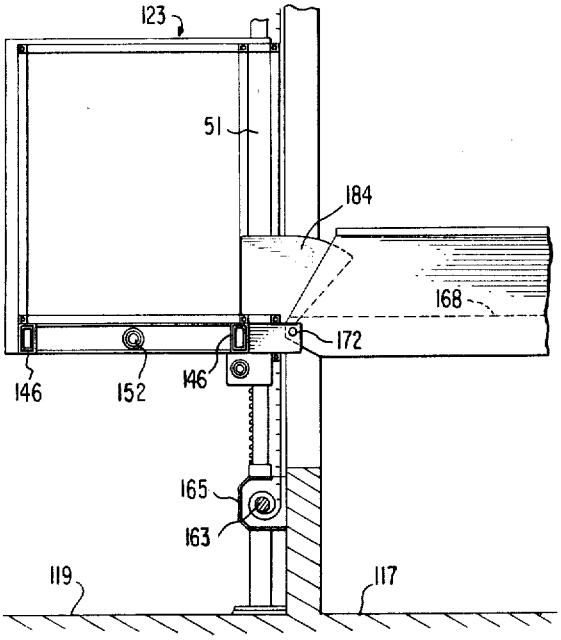
FIG. 10
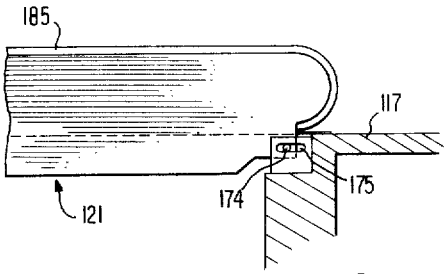
INVENTOR
WILLIAM M. RIGGLES, JR.
BY Shanley & O'Neil
ATTORNEYS

CONVEYANCE LOADER SYSTEM

Original Filed July 14, 1966 4 Sheets-Sheet 4

INVENTOR
WILLIAM M. RIGGLES, JR.
Shanley & O'Neil
ATTORNEYS

United States Patent Office

Re. 26,859
Reissued Apr. 21, 1970

26,859
CONVEYANCE LOADER SYSTEM

William M. Riggles, Jr., Hialeah, Fla., assignor, by mesne assignments, to Wollard Aircraft Equipment, Inc., Miami, Fla., a corporation of Washington Original No. 3,391,416, dated July 9, 1968, Ser. No. 565,175, July 14, 1966. Application for reissue Apr. 21, 1969, Ser. No. 822,062
Int. Cl. B65g *11/00*
U.S. Cl. 14—71 16 Claims

Matter enclosed in heavy brackets [ ] appears in the original patent but forms no part of this reissue specification; matter printed in italics indicates the additions made by reissue.

ABSTRACT OF THE DISCLOSURE

A conveyance loader system for incorporation into a building component in which a horizontal telescoping tunnel portion for connection with the conveyance is movable up and down along a vertical guideway mounted contiguous to the building component so as to register with conveyance doorways of varying heights and including a stairway or an elongated passageway connecting the tunnel portion with the floor level of the building.

CROSS-REFERENCE TO RELATED APPLICATION

Applicant: William M. Riggles, Jr., Ser. No. 565,188, filed July 14, 1966, title: Telescoping Conveyance Loader.

BACKGROUND OF THE INVENTION

The present invention is an improved form of the now well-known conveyance loader, such as aircraft gangways. These structures connect a terminal building with the doorway of an aircraft so that passengers or lading can move from the terminal to the aircraft or from the aircraft to the terminal without being exposed to the weather. Many forms of this apparatus have been proposed and some are in use. These devices all require an aircraft connecting portion which can be varied in height for the different types of aircraft and which can be automated to rise and fall as the aircraft doorway height from the ground varies due to changes in the number of passengers or the weight of lading on board. The present system provides for the rising and lowering of the aircraft connecting portion of the loader by the most economical means while maintaining this portion of the loading system in a horizontal plane for easiest alignment with the aircraft doorway. The means provided for this purpose comprises a guideway system contiguous to or supported by the terminal building with power means for raising and lowering the loader element on the guideway system.

In many airport facilities, "fingers" extend from the terminal building at ground level in different directions so as to accommodate numerous airplanes at the airport terminal at the same time. In such cases there is no second story of the terminal building available adjacent to the parking place of an airplane to be loaded or unloaded. The present invention provides a loader system which can be adapted to a ground level projection or finger of a terminal while at the same time being inherently capable of conversion into a second story loader in case the second story of the terminal is extended out to the aircraft parking space.

The present system is also suitable for the second story loader environment where considerable difference in height of aircraft doorways must be accommodated. In such cases a very long tunnel section can be used between a loader vestibule at a second story doorway in the building wall and the aircraft connecting portion of the loader which is carried up and down on the building supported guideways.

DESCRIPTION OF THE INVENTION

Preferred embodiments of the present invention are disclosed in the accompanying drawings in which FIGURE 1 is a perspective view on a reduced scale of a loader system of the present invention from a vantage point outside of the terminal building;

FIGURE 5 is an end view of the embodiment of FIGURE 1 looking from the left to the right in FIGURE 1;

FIGURE 6 is an enlarged fragmentary view in horizontal section taken on the line 6—6 of FIGURE 5;

FIGURE 7 is an enlarged fragmentary view in horizontal section taken on the line 7—7 of FIGURE 5;

FIGURE 8 is an enlarged fragmentary view in vertical section taken on the line 8—8 of FIGURE 7;

FIGURE 10 is a fragmentary view partly in section and partly in elevation, similar to FIGURE 4, of a modification of the embodiment illustrated in FIGURES 1 to 9, inclusive;

Figure 1:
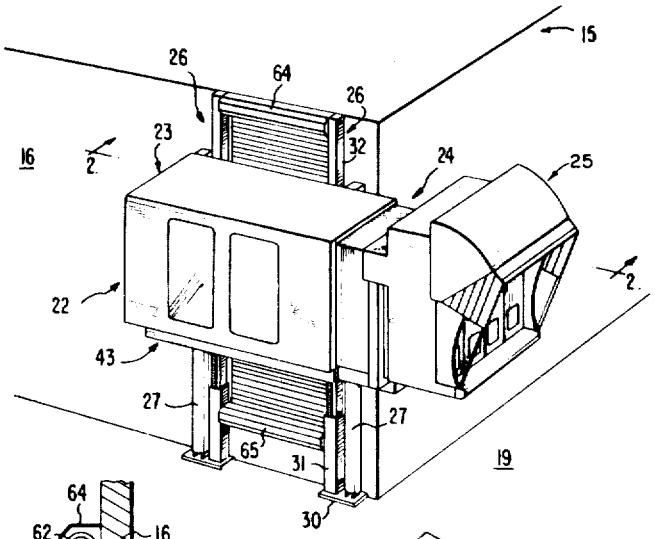
Figure 4:
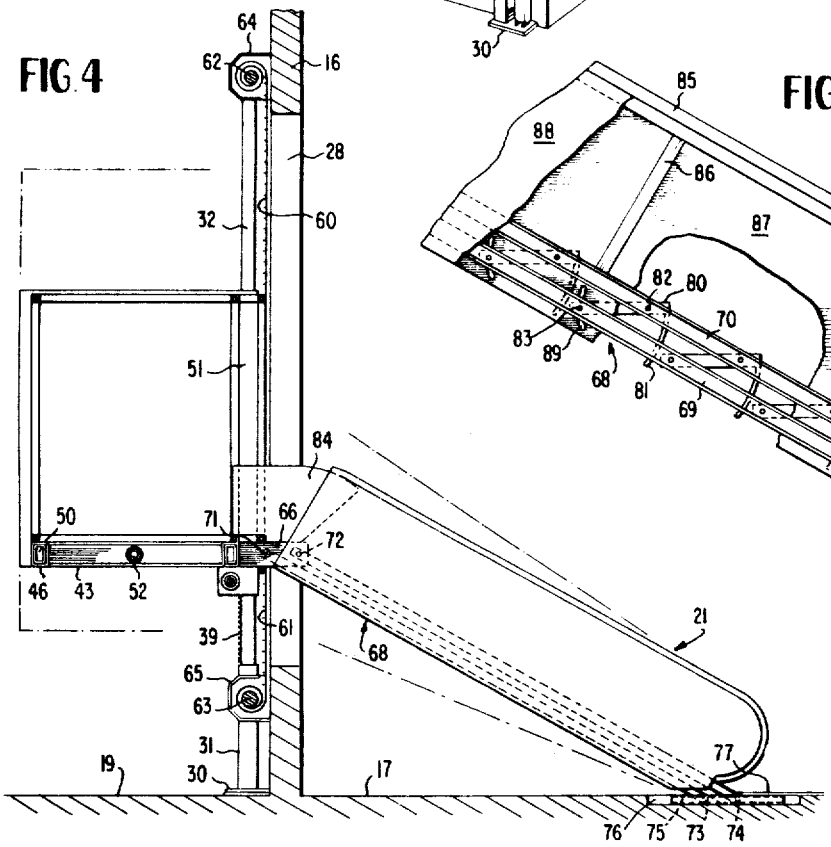
FIGURE 4 is a view in vertical section on the line 4—4 of FIGURE 2 with some parts shown in elevation.

Referring to FIGURES 1 to 9, inclusive, reference numeral 15 indicates generally a two-story terminal building with an end wall 16 and having a floor 17 which is at about the same elevation as the apron 19 on which an aircraft to be loaded and unloaded is parked. A variably inclinable stairway indicated generally at 21 leads upwardly to a loader tunnel indicated generally at 22 made up of a short horizontal tunnel section or terminal vestibule indicated generally at 23 and a telescopically received, horizontally movable tunnel section indicated generally at 24, the latter including an aircraft engaging vestibule indicated generally at 25. Tunnel section 23 is movable up and down on a guideway system indicated generally at 26 by fluid actuated motors indicated at 27. In moving up and down loader tunnel 22 carries with it the upper end of an elongated passageway means in the form of a stairway 21 through the interconnection of loader tunnel 22 and stairway 21 within elongated vertical opening 28 in the building wall.

Describing the components of the system of the present invention in more detail, the guideway system 26 is made up of a pair of identical guide members which in some cases can be reduced to a single guide member located approximately in the position of the right-hand guide member in FIGURE 1. In each component of this duplicate guideway arrangement a base plate 30 has welded to it a vertically positioned rectangular tube 31 which telescopically and snugly receives and braces an elongated vertical guide member 32 which is similarly shaped. At its upper end, guide member 32 is welded to a bracket 33 (FIGURE 5) which in turn is bolted at 34 (FIGURE 2) to the side wall of building 15. Tunnel section 23 carries two identical guide member engaging elements 36 which extend substantially the full height of tunnel section 23 and in cross section have the same configuration as guide members 32 but are slightly larger so as to snugly and slideably receive guide members 32.

Tunnel section 23 is supported on the two fluid motors or hydraulic jacks 27. These fluid motors are identical and are pivotally supported at 38 on base plate 30 (FIGURE 5). The piston rod 28 is pivotally connected at 29 on the framework of tunnel section 23 (FIGURE 5).

Where two fluid motors are used, as illustrated, a gear and rack assembly is provided to insure that each of the fluid motors will extend the same distance as tunnel section 23 moves up and down. Thus the lower portions of guide members 32 carry on the side facing tunnel section 23 a pair of identical racks 39 and the lower portions of guide member embracing elements 36 have that side removed, as best seen in FIGURE 7, so that racks 39 can engage with a pair of pinion gears 40 rigidly mounted on a rotating shaft 41. Shaft 41 is journaled in a frame member 42 which is rigidly attached to the supporting frame 43 of tunnel section *23* [25]. Each rack 39 and the open side of each guide member embracing element 36 coincide in extent to permit meshing of each gear 40 with the associated rack at the highest point of upward movement of tunnel section 23 and to accommodate the protruding rack at the lowest point of movement of tunnel section 23, respectively.

Since it is desired to have tunnel section 23 as short as possible, special provision is made for supporting telescoping tunnel section 24 and this specific construction is the subject matter of copending application Ser. No. 565,188. Briefly, supporting framework 43 of tunnel section 23 has longitudinal tubular members 46 extending the length of the tunnel section and open at that end of tunnel section 23 which carries tunnel section 24. At the outer end of tunnel 24 a vertically disposed framework structure 47 has rigidly mounted on its lower end a pair of tubular beam members 50 which, including antifriction bearing surfaces, are snugly and telescopically received within longitudinal tubular members 46 of tunnel section 23. Thus the outer end of tunnel section 24 is supported by longitudinal frame members 46 and telescopically received beams 50 without the need for the usual long overlap and complicated telescopic interfitting construction.

A fluid motor or hydraulic jack 52 is pivotally connected at 53 to the supporting framework 43 of tunnel section 23 and piston rod 54 has pivotal connection 55 with framework structure 47, whereby tunnel section 24 can be moved inwardly and outwardly of tunnel section 23.

The outer end portion of tunnel section 24 can be the conventional vestibule or airplane doorway engaging structure which is pivoted for limited movement at 56 and 57 on framework structure 47 of tunnel section 24. This pivotal mounting of the airplane vestibule permits accommodation of the end of the loader to the curvature of the nose of the plane being serviced. Since this limited pivotal construction at this point is broadly speaking old in the art and forms no part of the present invention, no further detailed description will be given here. This also applies to the airplane fuselage contacting and sealing structure 58 and to doors 59 for closing off the aircraft end of the loader when not in use.

The vertically elongated opening 28 in the wall of building 15 is closed above and below tunnel section 23 by means of flexible curtains 60 and 61, respectively, with their vertical margins received in channels 90 supported on wall 16 and having their free ends attached to the upper and lower members of doorway frame 51 of tunnel section 23. As tunnel section 23 moves upwardly and downwardly, curtains 60 and 61 can be rolled up on and unrolled from reels 62 and 63, respectively, by any suitable winding mechanism such as springs or weights not shown. Reels 62 and 63 are encased in housings 64 and 65, respectively.

Doorway frame 51 defines an open doorway which is at the top of stairway 21. The supporting framework 43 of tunnel section 23 includes laterally projecting framework members 66 which support a doorstep 67 (FIGURE 3) and the upper end of the stairway framework indicated generally at 68. This framework includes on each side of the stairway a pair of tread supporting channel members 69, 70 which form the long sides of a parallelogram in which the upper and lower ends of channels 69 and 70 are pivoted in supporting structures. The upper ends are pivoted in framework 66 at points 71 and 72 and the lower ends are pivotally supported at 73 and 74 on rollers which run in a trackway 75 built into a recess 76 in floor 17. A sliding floor plate 77 covers the trackway and recess 76 on the approach side of the stairs.

Figure 9:
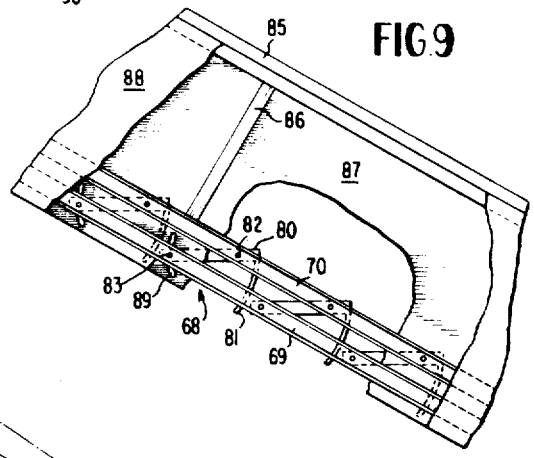
FIGURE 9 is an enlarged fragmentary view in elevation of a portion of FIGURE 4 with parts broken away for clarity.
Figure 2:
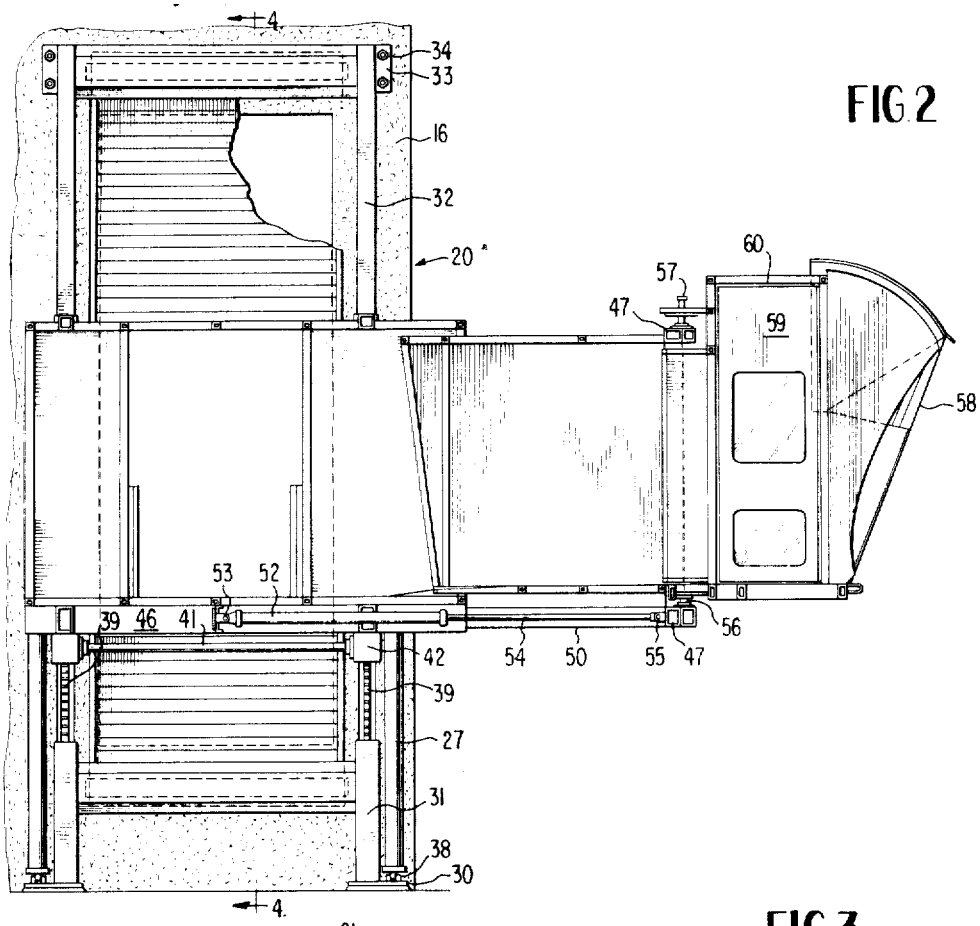
FIGURE 2 is a view taken in vertical section on the line 2—2 of FIGURE 1.
Figure 3:
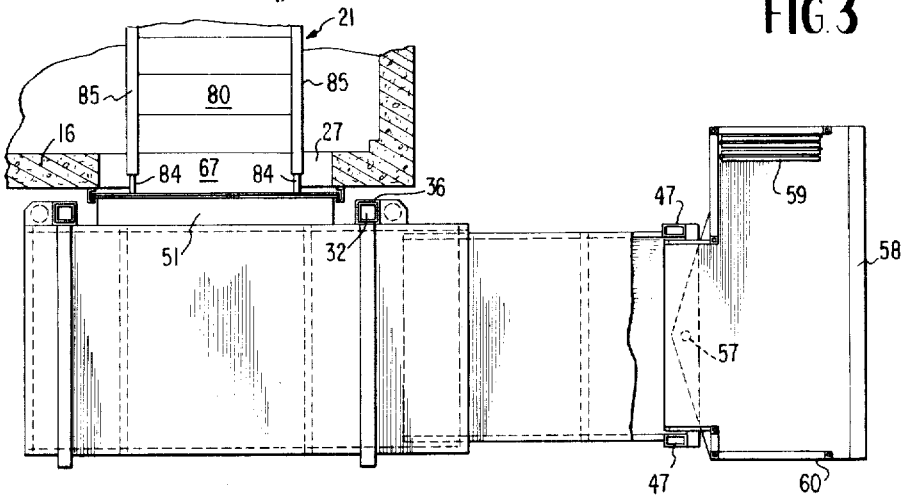
FIGURE 3 is a view in plan of the loader of FIGURE 1 with parts in section.

The stair tread construction is illustrated in FIGURE 9. Each step element is made up of a tread 80 carrying a depending integral riser 81 which is curved to accommodate relative movement of the treads as the inclination of the stairway is changed due to raising and lowering of tunnel section 23. The stair treads are maintained horizontal by being pivoted at points 82 and 83 in the webs of channels 70. Guards rails 84 are carried by tunnel section 23. Hand rails 85 are supported on posts 86 carried by channel 70 and inner and outer sheathing 87 and 88 is provided for ornamental purposes. Arcuate slots 89 are necessary in sheathing 87 to accommodate movement of pivots 83 as channel 69 moves relative to the remainder of the staircase frame.

Suitable additional framework is provided for supporting the necessary floors (omitted in places for clarity) and for carrying the necessary collateral material (omitted in places for clarity) for enclosing the loader tunnel 22 but these form no part of the present invention and will not be described in detail.

The modification of the invention illustrated in FIGURE 10 is in all respects the same as that illustrated in FIGURES 1 to 9, inclusive, except that instead of the passengers approaching the aircraft from the ground floor and therefore requiring a stairway to enter the conveyance, FIGURE 10 illustrates the use of a bridge-type passageway for second story loading. In describing the modifications the same reference numerals will be used where practicable *in FIGURES 10, 11 and 12* as those used in FIGURES 1 to 9, inclusive, but with 100 added in each instance. Thus the bridge type passageway is indicated generally at 121. This bridge or passageway 121 is elongated in order to reduce as much as practicable the inclination of this walkway to tunnel section 123. The stair handrails 85 of the preceding modification have their equivalent guide rails 185 and the step construction 68 is replaced by a simple flooring 168 supported by any suitable framework. As in the preceding modification a rolling pivot is needed at one end of bridge 121 and this is provided in this modification by slot 175 in the abutment and rolling pivot 174. Pivot 172 supports the tunnel end of the bridge.

It will be noted that the embodiment of the invention illustrated in FIGURES 1 to 9, inclusive, is suitable for use in terminal buildings where there is no second floor adjacent to the aircraft loading position and therefore the passengers need stairs 21. Where a terminal is improved as time goes by and a second floor 117 is added, the same loader can still be utilized by merely substituting bridge 121 for the stairway 21.

Figure 11:
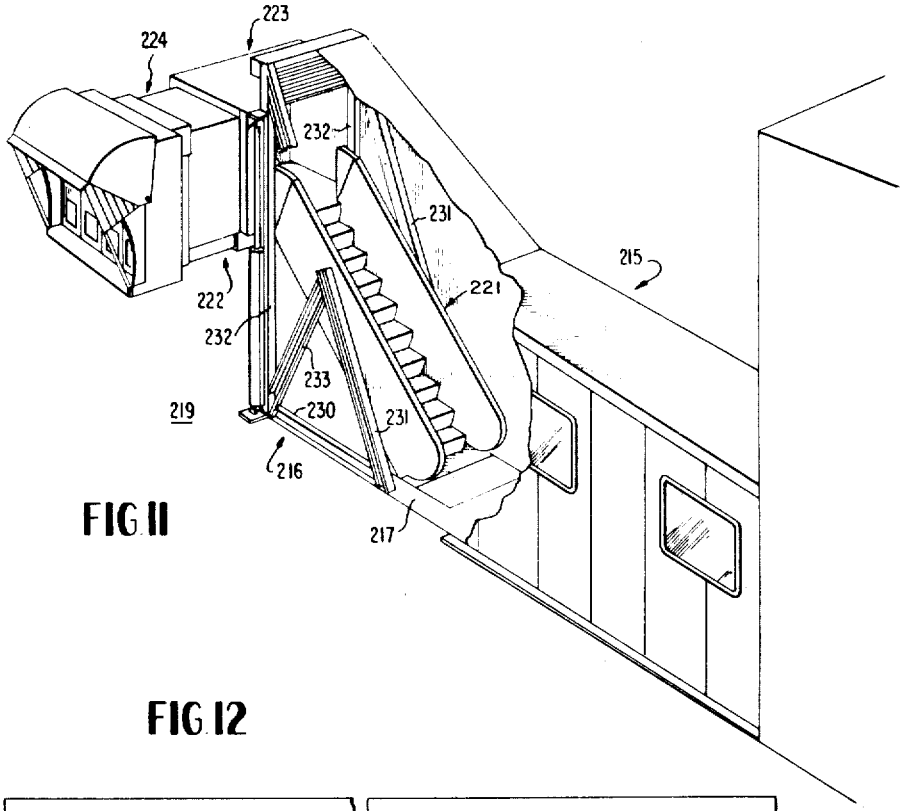
FIGURE 11 is a perspective view with parts broken away of another modification.

The modification of the present invention illustrated in FIGURE 11 incorporates the identical loader system illustrated in FIGURES 1 to 9, inclusive, but show this system installed in a "finger" or ground level extension 215 from the main portion of the terminal building. This finger constitutes a component of the terminal building. Here instead of a side wall of the terminal building proper being utilized in the mounting of the loader, twin trusses indicated generally at 216, in conjunction with an extension of the building floor 217 or the apron 219, support and brace guide members 232. In trusswork 215 a base member 230 and girder 231 braced by strut 233 hold the top of guide member 232 against movement. In all other important aspects the embodiment illustrated in FIGURE 11 corresponds to that of FIGURES 1 to 9, inclusive.

Figure 12:
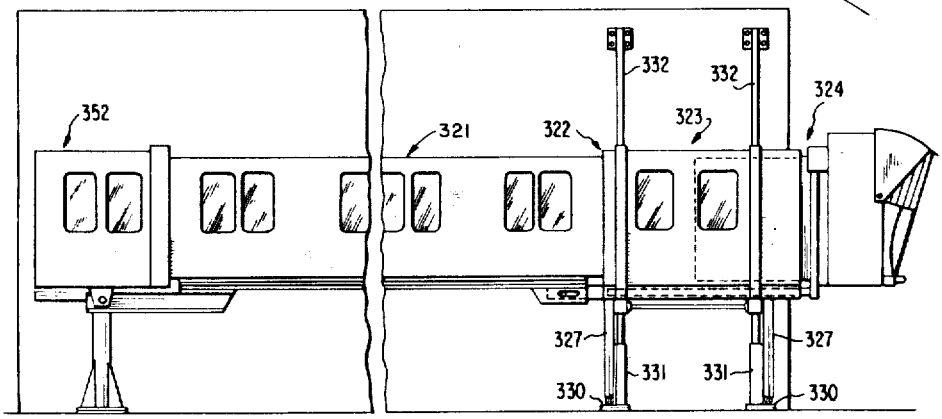
FIGURE 12 is a view in side elevation of still another modification.

The modification of FIGURE 12 is provided for situations in which a large amount of vertical movement of tunnel section 323 is desired and therefore an extremely long bridge or passageway *321* [231] is desirable. In this modification a terminal vestibule indicated generally at [392] *352* is provided which registers with a door (not shown) in the wall of the terminal building at second floor level. *Passageway 321 in this case connects with an opening in the end wall of tunnel section 323.* This modification shows that guide members 332 can be utilized in this environment instead of more expensive elevating mechanisms.

I claim:

1. A conveyance loading system comprising:

(a) a building component having a vertically disposed building element, (b) a guide member having an upper end portion, a lower end portion and an intermediate portion, (c) means supporting at least the lower end portion of the guide member with the intermediate portion vertically and rigidly positioned contiguous, to the building element, (d) a horizontally disposed first tunnel section, (e) means interconnecting the first tunnel section and the guide member for guided vertical movement of the first tunnel section up and down the intermediate portion of the guide member with the first tunnel section at all times maintained in horizontal position, (f) power actuated means for causing said guided movement of the first tunnel section relative to the guide member, (g) means forming an entrance opening in a wall of the first tunnel section, (h) elongated passageway means, (i) first pivot means interconnecting one end of the elongated passageway means and the first tunnel section contiguous to the first tunnel section entrance opening for swinging movement of the passageway means relative to the first tunnel section in a vertical plane, (j) floor means forming a second passageway means associated with the building component, (k) second pivot means interconnecting the other end of the elongated passageway means and the second passageway means for swinging movement of the elongated passageway means relative to the second passageway means in a vertical plane, (l) a second tunnel section carried by and telescopingly interconnected with the first tunnel section for movement of the second tunnel section in a straight, horizontal line toward and away from a conveyance.

2. A conveyance loading system as claimed in claim 1 in which (a) the means supporting the guide member as set out in limitation (c) includes a rigid attachment between the upper end portion of the guide member and the building element.

3. A conveyance loading system as claimed in claim 1 in which (a) the guide member of limitation (b) is tubular in cross section, and (b) the means of limitation (c) includes a member carried by the first tunnel section slideably embracing at least the sides of the tubular guide member not facing the first tunnel section.

4. A conveyance loading system as claimed in claim 1 in which (a) a vertically elongated opening is formed in the building component in registry with the entrance opening of limitation (g) at all positions of the first tunnel section in movement of the first tunnel section up and down on the guide member, (b) a closure member is provided having an upper end attached to the building component above the upper end of the building component opening and a lower end attached to the first tunnel section, and (c) means is provided for moving the closure member downwardly as the first tunnel section moves downwardly into closing relation with that portion of the building component opening which extends above the first tunnel section.

5. A conveyance loading system as claimed in claim 1 in which (a) there is means forming a vertically elongated opening in the building element substantially coinciding with the path followed by the entrance opening of limitation (g) as the first tunnel section moves up and down, (b) curtain means extend across the width of the exposed portion of the elongated opening when the first tunnel section is in lowermost position, the curtain means being connected to the first tunnel section above the entrance opening and being connected to the building element above the elongated opening, and (c) means for receiving and holding that portion of the curtain means which extends above the top of the elongated opening as the first tunnel section moves upwardly.

6. A conveyance loading system as claimed in claim 1 in which (a) the elongated passageway means is in the form of a stairway, and (b) the second pivot means is located at a level below the first pivot means and includes a linearly movable connection relative to the building component.

7. A conveyance loading system as claimed in claim 1 in which (a) the building component is in the form of a one story projection having a roof, (b) the second passageway is a floor in the one story projection contiguous to the level of the conveyance supporting surface, (c) a portion of the roof on the end of the projection extends above the height of the first tunnel section at the highest position of the first tunnel section, and (d) the elongated passageway is in the form of a stairway.

8. A conveyance loading system as claimed in claim 1 in which (a) the building component is one story in height and has a roof, (b) the second passageway means is a floor in the building component contiguous to the level of the conveyance supporting surface, (c) the vertically disposed building element comprises a structural framework extending upwardly to a height greater than the roof of the one story building component, and (d) the elongated passageway means is in the form of a stairway.

9. A conveyance loading system as claimed in claim 1 in which (a) the second passageway means is the floor of the building component at second story level, and (b) the elongated passageway means is a bridge element.

10. A conveyance loading system as claimed in claim 1 in which (a) the elongated passageway means is a tunnel section, and (b) the second passageway means is a terminal vestibule connected to the building component.

11. A conveyance loading system comprising:

(a) a building component having a vertically disposed wall, (b) a horizontally disposed first tunnel section on the exterior side of the building wall, (c) means forming an entrance opening in a wall of the first tunnel section, (d) means supporting the horizontally disposed first tunnel section for movement along a vertical path in contiguous relationship to the vertically disposed building wall, (e) power-actuated means for causing the movement of the first tunnel section along the vertical path, (f) a vertically elongated opening in the building component wall in registry with the entrance opening of the first tunnel section at all positions of the first tunnel section along the vertical path, (g) elongated passageway means on the interior side of the vertically disposed building wall, (h) first pivot means acting between one end of the elongated passageway means and the first tunnel section contiguous to the first tunnel section entrance opening to accommodate swinging movement of the passageway means relative to the first tunnel section in a vertical plane, (i) floor means forming a second passageway means associated with the building component, (j) second pivot means acting between the other end of the elongated passageway means and the second passageway means to accommodate swinging movement of the elongated passageway means relative to the second passageway means in a vertical plane,

[(k) a closure member having an upper end portion, the upper end portion having connection with the building component wall above the upper end of the building component opening and the closure member having a lower end portion connected to the first tunnel section,]

[(l) means for moving the closure member downwardly, as the first tunnel section moves downwardly, into closing relation with that portion of the building component opening which extends above the first tunnel section, and]

*(k) upper and lower closure members closing the vertically elongated opening in the building above and below the first tunnel section, respectively,*

*(l) means connecting the lower end portion of the upper closure member to the upper portion of the first tunnel section,*

*(m) means connecting the upper end portion of the lower closure member to the lower portion of the first tunnel section,*

*(n) means connecting the building component and the closure members to maintain the closure members in closing relation to the elongated opening while accommodating movement of the closure members on vertical movement of the first tunnel section, and*

(o) [(m)] a second tunnel section carried by and telescopically interconnected with the first tunnel section for movement of the second tunnel section in a straight, horizontal line toward and away from a conveyance.

12. A conveyance loading system as claimed in claim 11 in which (a) the building component is in the form of a one story projection having a roof, (b) the second passageway is a floor in the one story projection contiguous to the level of the conveyance supporting surface, (c) a portion of the roof on the end of the projection extends above the height of the first tunnel section at the highest point of movement of the first tunnel section, and (d) the elongated passageway is in the form of a stairway.

13. A conveyance loading system as claimed in claim 11 in which (a) the building component is one story in height and has a roof, (b) the second passageway means is a floor in the building component contiguous to the level of the conveyance supporting surface, (c) the vertically disposed building component wall comprises a structural framework extending upwardly to a height greater than the roof of the one story building component, and (d) the elongated passageway means is in the form of a stairway.

14. A conveyance loading system as claimed in claim 11 in which (a) the second passageway means is the floor of the building component at second story level, and (b) the elongated passageway means is a bridge element.

[15. A conveyance loading system as claimed in claim 11 in which there are means for receiving and holding that portion of the curtain means which extends above the top of the elongated opening as the first tunnel section and moves upwardly.]

*16. A conveyance loading system comprising:*

*(a) a building component having a vertically disposed building element,*

*(b) a guide member having an upper end portion, a lower end portion and an intermediate portion,*

*(c) means immovably supporting the lower end portion of the guide member relative to the ground with the intermediate portion vertically and rigidly positioned relative to the ground,*

*(d) a horizontally disposed first tunnel section,*

*(e) means interconnecting the first tunnel section and the guide member for guided vertical movement of the first tunnel section up and down the guide member above the lower end portion,*

*(f) means associated with means (e) maintaining the first tunnel section in horizontal position at all times,*

*(g) power actuated means for causing said guided movement of the first tunnel section relative to the guide member,*

*(h) means forming an entrance opening in a wall of the first tunnel section,*

*(i) elongated passageway means,*

*(j) first pivot means interconnecting one end of the elongated passageway means and the first tunnel section contiguous to the first tunnel section entrance opening for swinging movement of the elongated passageway means relative to the first tunnel section in a vertical plane,*

*(k) a second passageway means associated with the building component,*

*(l) second pivot means interconnecting the other end of the elongated passageway means and the second passageway means for swinging movement of the elongated passageway means relative to the second passageway means in a vertical plane, and*

*(m) a second tunnel section carried by and telescopingly interconnected with the first tunnel section for movement of the second tunnel section in a straight, horizontal line toward and away from a conveyance.*

*17. A conveyance loading system as claimed in claim 16 in which*

*(a) the guide member of limitation (b) of claim 16 has extensive with the length of at least the intermediate portion thereof a first longitudinal surface means facing toward the conveyance end of the first tunnel section, a second longitudinal surface means facing away from the conveyance end of the first tunnel section and a third longitudinal surface means facing away from the first tunnel section, and*

*(b) the means of limitation (e) of claim 16 includes means contiguous to the uppermost and lowermost portions of the first tunnel section for guiding engagement with the first, second and third longitudinal*

*surface means of the guide member during up and down movement of the first tunnel section.*

References Cited

The following references, cited by the Examiner, are of record in the patented file of this patent or the original patent.

UNITED STATES PATENTS

| | | | |
|---|---|---|---|
| 3,046,908 | 7/1962 | Der Yuen | 14—71 XR |
| 3,099,847 | 8/1963 | Lodjic | 14—71 |
| 3,317,942 | 5/1967 | Wollard et al. | 14—71 |

JACOB L. NACKENOFF, Primary Examiner